United States Patent [19]

Tooyama et al.

[11] 4,212,030
[45] Jul. 8, 1980

[54] BEAM INDEX COLOR CATHODE RAY TUBE

[75] Inventors: Akira Tooyama; Akio Ohkoshi, both of Tokyo; Takashi Tooyama, Kokubunji; Takahiro Yukawa, Tokyo; Takashi Hosono, Yokohama, all of Japan

[73] Assignee: Sony Corporation, Tokyo, Japan

[21] Appl. No.: 969,861

[22] Filed: Dec. 15, 1978

[30] Foreign Application Priority Data

Dec. 20, 1977 [JP] Japan .................................. 52-153297

[51] Int. Cl.² .............................................. H04N 9/24
[52] U.S. Cl. ...................................................... 358/67
[58] Field of Search ........................ 358/67, 68, 69, 70

[56] References Cited
U.S. PATENT DOCUMENTS 4,163,250  7/1979  Tomii et al. ........................... 358/45

Primary Examiner—Robert L. Richardson
Attorney, Agent, or Firm—Lewis H. Eslinger; Alvin Sinderbrand

[57] ABSTRACT

A beam index color cathode ray tube has index stripes spaced apart across a run-in area of the screen and which have a pitch substantially equal to the pitch of index stripes in an image area. A plurality of the index stripes in the run-in area generate an index signal as an electron beam scans them. An index stripe is omitted from the portion of the run-in area nearest the boundary with the image area to provide a characteristic to the index signal which permits generation of a trigger signal to preset color control circuits to a known condition as the electron beam enters the image area. A gating circuit blocks trigger signals which may be generated during scanning of the image area.

21 Claims, 32 Drawing Figures

PRIOR ART

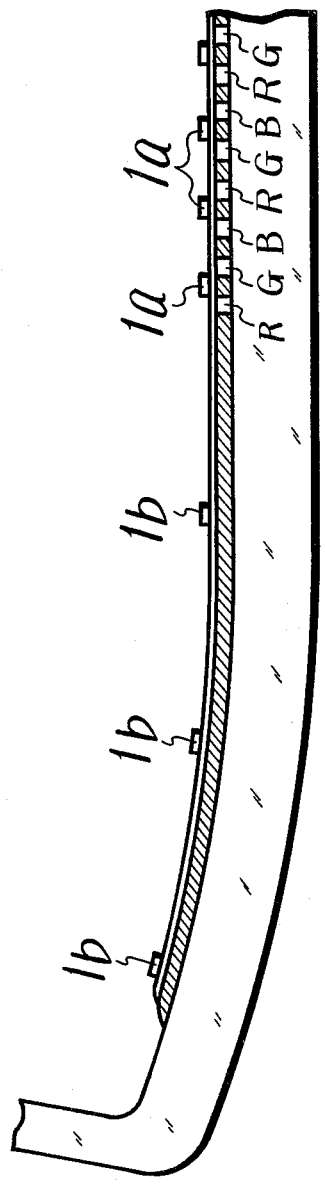
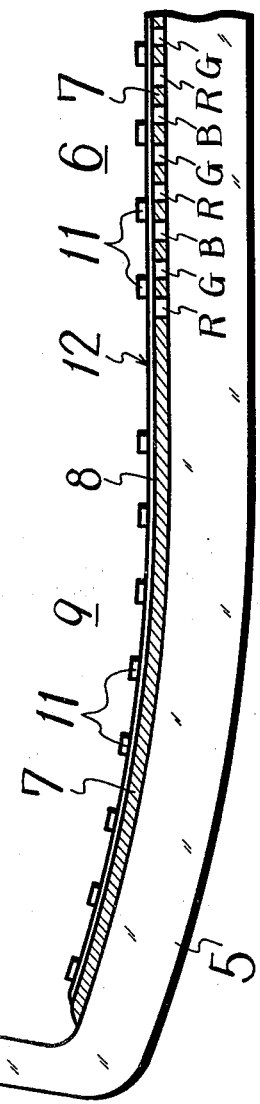
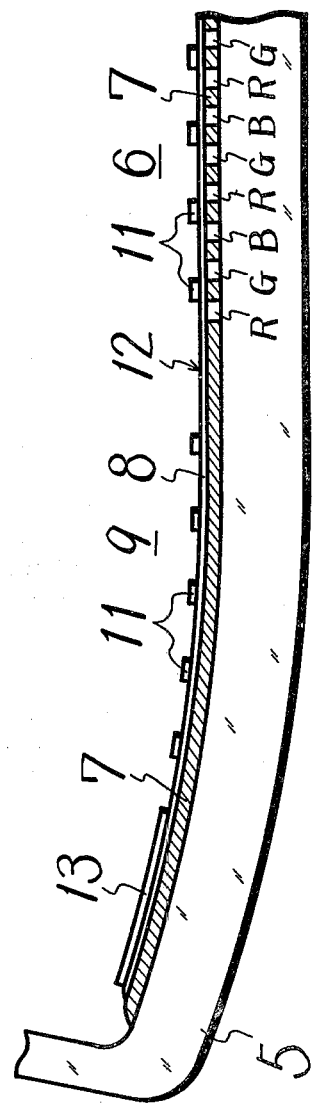
FIG. 4 PRIOR ART
FIG. 5
FIG. 6

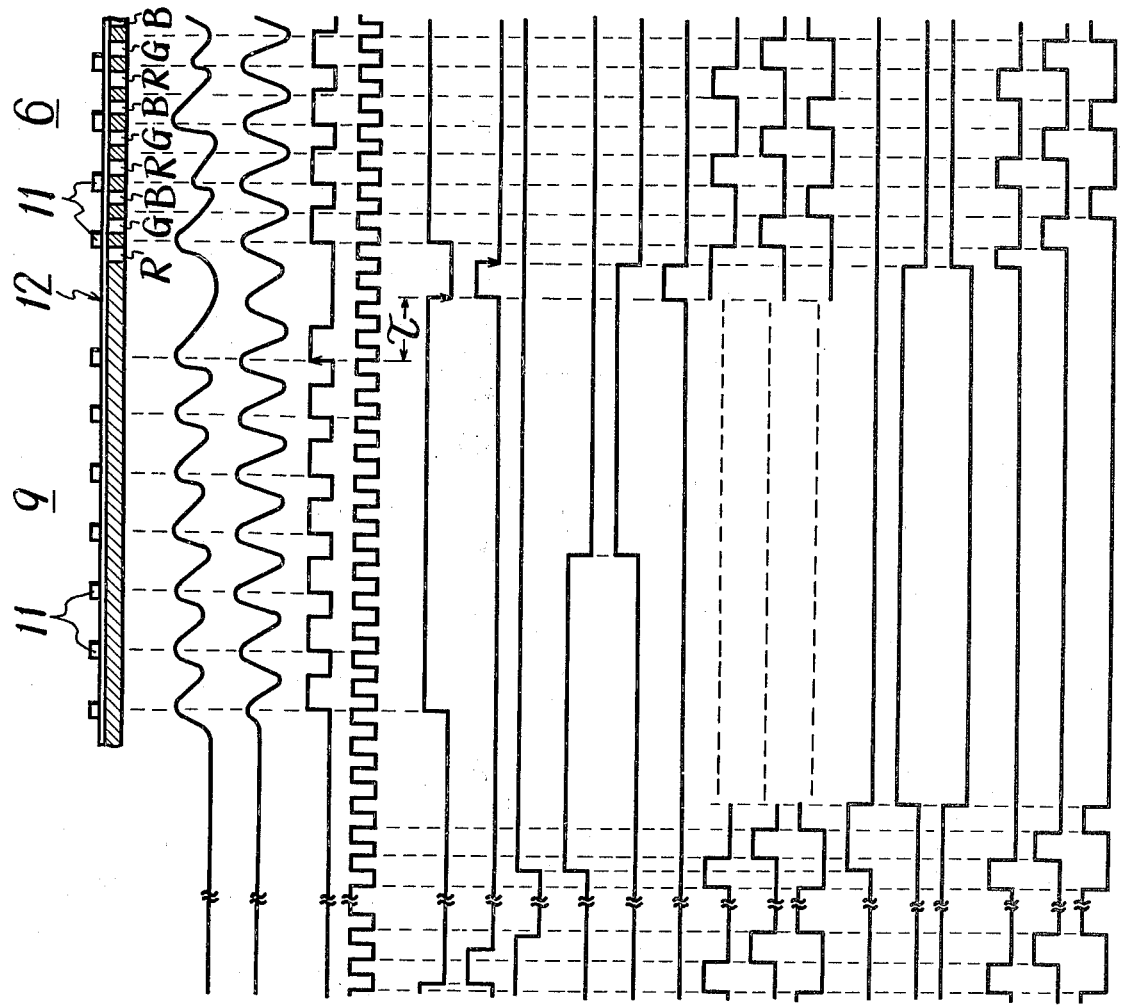

BEAM INDEX COLOR CATHODE RAY TUBE

BACKGROUND OF THE INVENTION

1. Field of the Invention

The present invention relates generally to a beam index color cathode ray tube, and more particularly to a beam index color cathode ray tube which can reproduce color with high fidelity.

2. Description of the Prior Art

In a prior art beam index color cathode ray tube, a single electron beam scans a target screen which consists of triads of parallel red, green and blue vertical color phosphor stripes sequentially repeating across the screen. The color phosphor stripes are sequentially scanned by a scanning electron beam which crosses the color phosphor stripes horizontally in sequence from one side of the screen to the other. Index phosphor stripes are provided on the inner surface of the screen parallel to and in known relationship to the color phosphor stripes. As the electron beam scans horizontally across the screen, it excites the index phosphor stripes into producing a light signal behind the screen. Such light signal is detected by a photodetector to produce an index signal which has a known relationship to the instantaneous position of the electron beam on the screen.

The index signal is used to control the modulation of the electron beam such that the electron beam is density modulated with the red primary color signal when the beam scans across a red phosphor stripe, with the green primary color signal when the beam scans across a green phosphor stripe and with the blue primary color signal when the beam scans across a blue phosphor stripe, respectively.

FIGS. 1-3 show arrangements of index phosphor stripes on the inner surface of the screen in prior art color cathode ray tubes. In FIG. 1, the pitch $P_I$ of the index phosphor stripes $1a$ is the same as, or an integral multiple of, the pitch $P_T$ of each triad of red, green and blue color phosphor stripes R, G and B. The positional relationship between the index phosphor stripes $1a$ and the respective triads of red, green and blue color phosphor stripes R, G and B is fixed and readily determined from the index signal and hence there is no need to provide a special circuit which establishes synchronization of the color modulation by the index signal and accordingly a simple circuit is sufficient.

Since the positional relation between the index phosphor stripes $1a$ and the red, green and blue phosphor stripes R, G and B is fixed, any phase shift in the index signal produced, for example, by color modulation of the scanning beam results in faulty color synchronization and degrades color reproduction fidelity. This is especially noticeable in the reproduction of highly saturated color since the high electron beam current for a particular highly saturated color creates an apparent shift in phase of the index signal.

For the above reason, a one-to-one relationship between index phosphor stripes $1a$ and color phosphor stripe triads is not desirable. Therefore, the arrangements in FIGS. 2 and 3 are used. The pitch $P_I$ of the index phosphor stripes $1a$ is selected to be a non-integral multiple of the pitch $P_T$ of the triads of color phosphor stripes. Thus, pitches $P_I$ of ⅔, 4/3 or generally $(3n\pm1)/3$ (where n is 0, 1, 2, - - -) of the pitch $P_T$ of the triads of red, green and blue color phosphor stripes R, G and B may be used. With the foregoing arrangement, the positional relationships between the index phosphor stripes $1a$ and the traids of red, green and blue color phosphor stripes R, G and B are varied sequentially so that a phase shift in an index signal due to a reproduced color signal does not appear uniformly across the screen and hence the color reproduction is achieved with higher fidelity.

With the latter arrangement, however, the variation in positional relationships across the screen between the index phosphor stripes $1a$ and the triads of red, green and blue color phosphor stripes R, G and B, requires a synchronization technique to establish color synchronization.

One way to establish color synchronization is to provide a means for determining when the electron beam begins scanning across the color phosphor stripes and to thereafter keep a running count of the index phosphor stripes that are scanned or crossed. A method of accomplishing this is shown in FIG. 4. The index phosphor stripes $1a$ are provided across the image area of the screen in non-integral spaced relationship with the triads of color phosphor stripes R, G and B, as previously described, and, in addition, a set of synchronizing index phosphor stripes $1b$ are provided on the beam scanning run-in or marginal area outside the image area of the screen. In order to distinguish between the run-in area and the image area, and thus to be able to discern the transition from area to the other, the pitch of the index phosphor stripes $1b$ in the run-in area is made suitably larger, for example, three times, the pitch of the index phosphor stripes $1a$ in the viewing area. The index signal obtained when the beam scans the index phosphor stripes $1b$ in the run-in area is used to establish color synchronization. However, since a plurality of phosphor stripes $1b$ are necessary in the run-in area and the pitch of the index phosphor stripes $1b$ is large, the width of the marginal portion of the screen must also be large when using the described scheme according to the prior art. In addition, if noise is mixed with the index signal from the run-in area, the noise can sometimes occur in positions which simulate the index signal from the viewing area. When this happens, color synchronization is displaced and incorrect colors are reproduced.

OBJECTS AND SUMMARY OF THE INVENTION

Accordingly, an object of the present invention is to provide a novel beam index color cathode ray tube free from the described defects encountered in the prior art.

Another object of the invention is to provide a beam index color cathode ray tube in which color synchronization can be performed correctly.

Still another object of the invention is to provide a beam index color cathode ray tube in which color synchronization is free from disturbance by noise.

A further object of the invention is to provide a beam index cathode ray tube in which the pitch of at least most of the index stripes in the run-in area is equal to the pitch of the index stripes in the image area.

It is a further object of the invention to provide a beam index cathode ray tube, as aforesaid, with a run-in area of reduced dimensions.

It is a further object of the invention to prevent faulty color synchronization resulting from momentary loss of an index signal while the electron beam is scanning the image area.

It is a further object of the invention to provide a beam index cathode ray tube which includes means for avoiding faulty synchronization by false triggering by noise in the extreme peripheral portion of the run-in area.

It is a further object of the invention to provide a beam index cathode ray tube in which a wide phosphor index stripe in the extreme peripheral portion of the run-in area raises the signal level in that area to a level which avoids false triggering by noise.

It is a still further object of the invention to provide a beam index cathode ray tube employing the omission of an index stripe from the portion of the run-in area nearest the boundary with the image area to establish color synchronization, so that the starting point of color control signals cannot be shifted forward by noise occurring before the electron beam reaches the image area.

According to an aspect of the invention, on the screen portion of a beam index cathode ray tube there is disposed an image area with repetitive sets of parallel color phosphor stripes having a first pitch and a run-in area contiguous to an edge of the image area, and a first set of index stripes is disposed on the image area parallel to the color phosphor stripes and has a second pitch different from the first pitch. A second set of index stripes is disposed on the run-in area and has the same pitch as the first set of index stripes but with the index stripe of said second set closest to said image area being omitted, and means are provided responsive to the electron beam scanning over the first and second sets of index stripes for generating an index signal.

According to another aspect of the invention, there is provided a control circuit for a beam index cathode ray tube of the type which generates an index signal indicative of the position of a scanning beam, and which comprises means for generating a counting signal having a frequency related to the frequency of the index signal, and trigger signal generating means enabled by a synchronizing signal for generating a trigger signal in response to a characteristic of the index signal. A frequency divider, which is operative in response to the counting signal to generate a sequential plurality of color control signals for sequentially controlling the application of respective color signals to the cathode ray tube, is preset by the trigger signal to assume a predetermined condition at the boundary between the run-in and image areas and thereby provide synchronization of the color control signals.

According to a feature of the invention, a broad index stripe is optionally provided at the outer perimeter of the run-in area. The broad index stripe raises the average signal level in that region to a high enough level to avoid triggering by noise. In a preferred embodiment, the instantaneous index signal level from the broad index stripe is made qual to the average level of the index signal as the electron beam scans across the normal width index stripes.

A control circuit employing a gap in the index signal, which arises due to the omission of the last index stripe in the run-in area, uses a retriggerable monostable multivibrator or the like which has a period just exceeding the normal period of the index signal. The retriggerable multivibrator resets the counter only when the end of its period is reached. If the retriggerable multivibrator is retriggered before the end of its period, its output remains unchanged for an additional period. Thus, an index signal consisting of cycles all having normal spacing continues to retrigger the retriggerable multivibrator before its period ends and thus prevents generating the trigger signal. When the gap occurs, the retriggerable multivibrator reaches the end of its period before being retriggered and the monostable multivibrator is thereby triggered into generating the trigger signal.

The means for generating a counting signal is preferably a phase locked loop, and most preferably a phase locked loop in which the frequency of its output is an integral multiple, advantageously twice, the frequency of the index signal.

The above, and other objects, features and advantages of the present invention, will become apparent from the following description read in conjunction with the accompanying drawings in which like reference numerals and letters designates the same elements.

BRIEF DESCRIPTION OF THE DRAWINGS

FIG. 4 is a cross-sectional view of part of the screen, including the run-in area, in a prior art beam index color cathode ray tube;

FIGS. 5 and 6 are cross-sectional views similar to FIG. 4, but showing embodiments of beam index color cathode ray tubes according to the present invention;

FIGS. 10A to 10U are waveform diagrams to which reference will be made in explaining the operation of the television receiver shown in FIG. 8.

DESCRIPTION OF THE PREFERRED EMBODIMENTS

Figure 1:
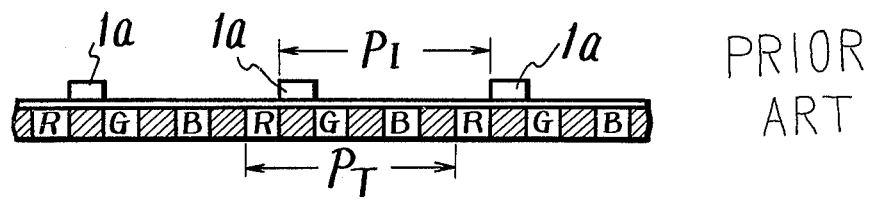
FIGS. 1 to 3 are fragmentary cross-sectional views of prior art beam index color cathode ray tube screens showing arrangements of index and color phosphor stripes.
Figure 2:
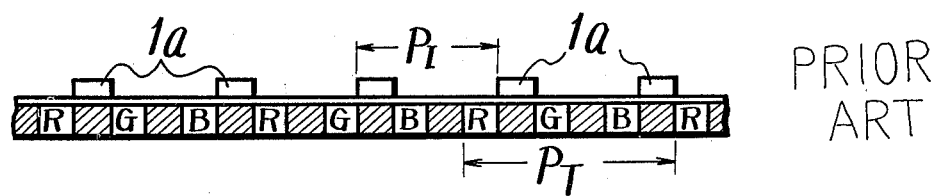
Figure 3:
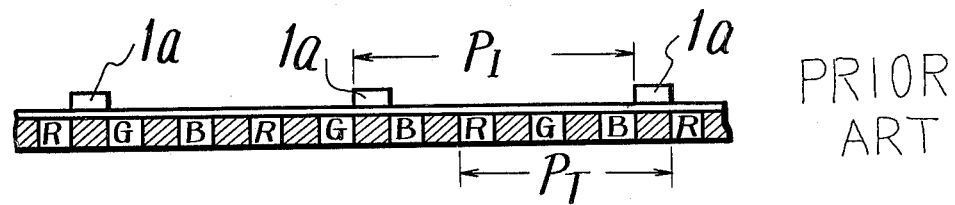

Referring now to FIG. 5, there is shown an embodiment of a beam index color cathode ray tube according to the present invention. A screen 5 of the beam index color cathode ray tube has vertically arranged on its inner surface, parallel triads of red, green and blue color phosphor stripes R, G and B. The triads are repeated in the horizontal scanning direction to define an image area 6. A black layer 7 is coated on the inner surface of the screen 5 between the adjacent color phosphor stripes R, G and B and on the entire marginal run-in area 9 outside the image area 6. The black layer 7 may be of any suitable material but is preferably of carbon or the like. A metallic back layer 8 for example, of aluminum, is thinly coated over the entire rear surface of the screen 5 including the color phosphor stripes R, G, B and black material layer 7. The metallic back layer 8 is substantially transparent to electrons but is an effective light reflector. Thus, the electron beam penetrates back layer 8 to excite the color phosphor stripes 1a but most of the light emitted is reflected forward to the viewer rather than being directed into the cathode ray tube.

Index phosphor stripes 11 are formed on the metal back layer 8 over the image area 6 and over the beam scanning run-in marginal area 9 at one side of the image area. The index phosphor stripes 11 in the image area 6 are located in the space between adjacent color phosphor stripes. The pitch of the index phosphor stripes 11 in the beam scanning run-in marginal area 9 and the image area 6 is equal to ⅔ of the pitch of the triads of color phosphor stripes R, G, B. Although a pitch of ⅔ is shown in FIG. 5, in general, any pitch having the relationship of $(3n \pm 1)/3$ to the pitch of the triads of color phosphor stripes R, G and B may be used.

Generally, in accordance with this invention, the index phosphor stripes 11 on the run-in area 9 are employed to prepare the tube and the control circuit for scanning the image area. The index phosphor stripe in the location 12 nearest the image area 6 is omitted. The omission of the index phosphor stripe in the location 12 is sensed in the control circuit and establishes color synchronization in preparation for scanning the image area 6, as will be explained.

Figure 8:
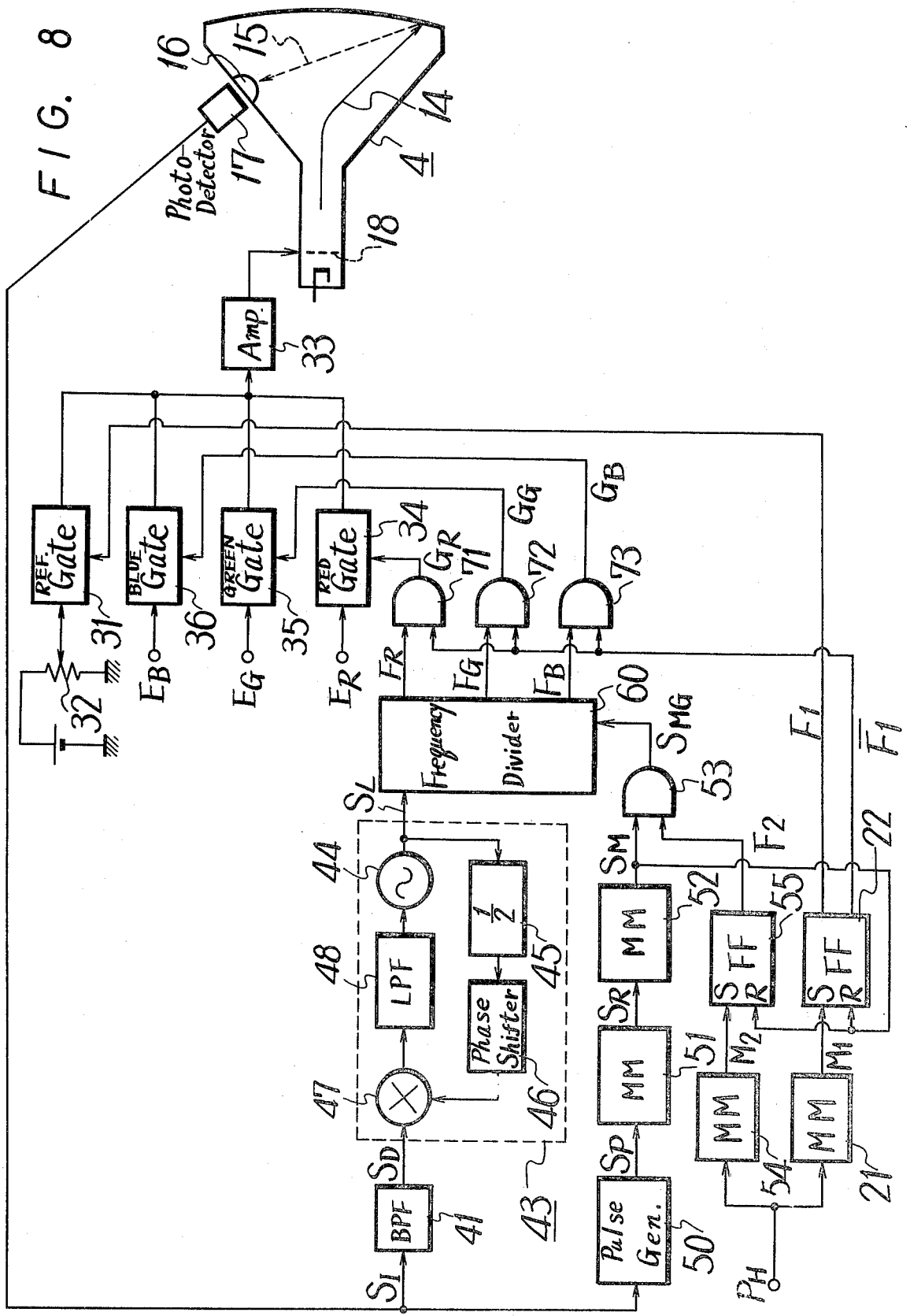
FIG. 8 is a block diagram showing a television receiver in which an embodiment of a beam index color cathode ray tube according to the present invention is employed.

Turning now to FIG. 8, a beam index color cathode ray tube 4 having the arrangement of index stripes 11 shown in FIG. 5, is shown further to have a lens 16 on the inner surface of the funnel portion. The lens 16 receives light radiation represented by dashed line 15 which is emitted by the index phosphor stripes (not shown in FIG. 8) as an electron beam 14 scans over them. Outside the funnel portion a photodetector 17 is disposed in a location where it can receive the light radiation 15 collected by the lens 16.

In the example of FIG. 8, a horizontal line synchronizing signal $P_H$ (FIG. 10G) is fed to a monostable multivibrator 21 which then produces a positive-going pulse $M_1$ (FIG. 10P) having a constant pulse width. The pulse $M_1$ is fed to the set input S of a flip-flop circuit 22 which is then set by the negative-going trailing edge of pulse $M_1$ and produces a set output $F_1$ of "1" (FIG. 10Q) and a reset output $\bar{F}_1$ of "0" (FIG. 10R). The set output $F_1$ enables or makes conductive a reference gate circuit 31 which is supplied with a DC voltage, whose value is previously adjusted by a variable resistor 32. The DC voltage is applied through enabled reference gate circuit 31 and an amplifier 33 to a first grid 18 of the cathode ray tube 4, so that the electron beam 14 is thereby controlled to have a constant value of intensity as it scans the index phosphor stripes 11 on the beam scanning run-in area. The constant electron beam 14 causes photodetector 17 to produce index signal $S_I$ (FIG. 10A).

The index signal $S_I$ is fed to a band pass filter 41 to produce a generally sinusoidal reference signal $S_D$ (FIG. 10B) with a fundamental frequency equal to the frequency of the index signal $S_I$. Reference signal $S_D$ is fed to a phase locked loop circuit 43 which then produces a pulse signal $S_L$ synchronized with the reference signal $S_D$, as shown on FIG. 10D. The phase locked loop circuit 43 includes a voltage controlled oscillator 44, providing oscillation pulses which are frequency divided by two in a frequency divider 45. The frequency divided pulses are fed to a phase shifter 46 for phase adjustment. The phase-adjusted pulses are fed to a phase comparator 47 to be phase-compared with the signal $S_D$ applied thereto from the band pass filter 41. The compared error voltage from phase comparator 47 is applied through a low pass filter 48 as the control voltage for voltage controlled oscillator 44 which thus produces the pulses $S_L$ phase locked to twice the frequency of reference signal $S_D$. The pulses $S_L$ are fed to a frequency divider 60 to be divided by three and phase shifted to produce three color gating pulse outputs $F_R$, $F_G$ and $F_B$ which are 120 degrees apart.

Monostable multivibrator 54 is triggered by the positive going trailing edge of the line synchronizing signal $P_H$ (FIG. 10G) into producing a signal $M_2$ (FIG. 10H) of fixed duration. The duration of the signal $M_2$ is selected to be long enough so that the electron beam will have completed a portion of its scan across index phosphor stripes 11 in the run-in area 9. At the negative going trailing edge of the signal $M_2$, a flip-flop circuit 55 is triggered into the set condition. Flip-flop circuit 55 provides a "1" on its set output $F_2$ to enable one input of AND gate 53.

The index signal $S_I$ from the photodetector 17 is also applied to a pulse generating circuit 50 from which index pulses $S_P$ (FIG. 10C) are obtained. Index pulses $S_P$ are fed to the input of a retriggerable monostable multivibrator 51.

Retriggerable monostable multivibrator 51 has a timing period $\tau$ slightly exceeding the period of the index pulses $S_P$. When retriggerable multivibrator 51 is retriggered again before the completion of its timing period $\tau$, its output remains unchanged until an index pulse fails to arrive in time. This is shown in FIG. 10E where the signal $S_R$ goes high upon the first positive-going leading edge of the index pulses $S_P$ and remains in that condition throughout a plurality of index pulses $S_P$ until after the positive-going leading edge of index pulse $S_P$ indicated by the upward pointing arrow in FIG. 10C. The omission of an index stripe in location 12 permits the timing period $\tau$ to end and produce the negative-going transition in the signal $S_R$ indicated by the downward pointing arrow in FIG. 10E.

The signal $S_R$ is fed to monostable multivibrator 52 which then produces a trigger pulse $S_M$ (FIG. 10F) at the positive-going trailing edge of the signal $S_R$ represented by a downward pointing arrow on FIG. 10E. The pulse $S_M$ has a width suitable to match the timing.

The trigger pulse $S_M$ is fed to one input of an AND gate 53 and to the reset inputs R of flip-flop circuits 22 and 55 which are then reset at the trailing edge of the pulse $S_M$. The gated trigger signal $S_{MG}$ (FIG. 10J) from AND gate 53 is applied to one input of a frequency divider 60. Thus, the set output $F_1$ and $F_2$ from flip-flop circuits 22 and 55 become "0" and the reset output signal $\bar{F}_1$ (FIG. 10O) becomes "1". When the output $F_1$ becomes "0", reference gate circuit 31 is inhibited. In addition, output $\bar{F}_1$, becoming "1" at this time, enables one input of each of AND gates 71-73. In addition, the "0" connected to one input of AND gate 53 from the set output $F_2$ of flip-flop circuit 55 avoids any possibility that the momentary loss of index signals $S_I$ in the image area can produce spurious trigger signals $S_{MG}$ and upset color synchronization.

The pulse $S_{MG}$ synchronizes the frequency divider 60 which, as previously indicated, frequency divides the counting signal $S_L$ from phase locked loop 43 by ⅓ and produces the red, green and blue color gating pulses $F_R$, $F_G$ and $F_B$ differing in phase by 120°, beginning with the color gating pulse required for the first required color just inside the image area 6 (red in the example).

Figure 9:
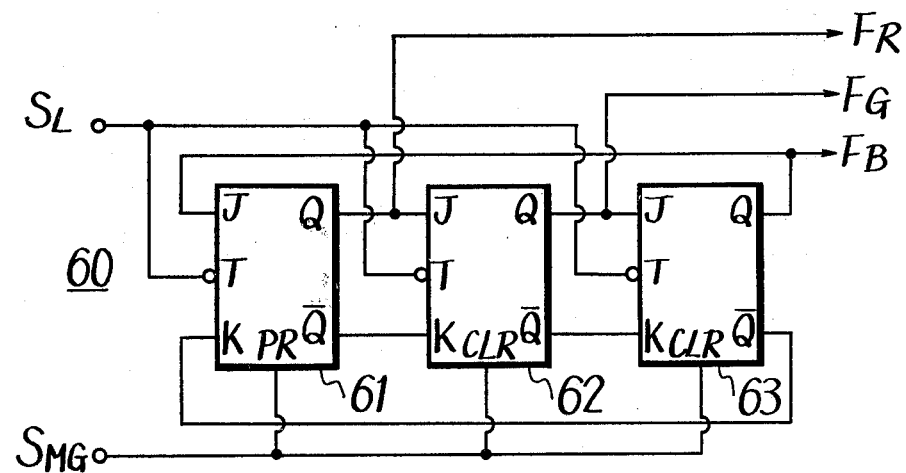
FIG. 9 is a detailed block diagram showing a frequency divider employed in the receiver of FIG. 8.

An example of a circuit that may constitute frequency divider 60 is described with reference to FIG. 9, where frequency divider 60 is in the form of a ring counter consisting of three stages of JK flip-flop circuits 61, 62 and 63 with the set Q and reset $\bar{Q}$ outputs of each flip-flop circuit connected to J and K inputs respectively of the following flip-flop circuit. The set Q and reset $\bar{Q}$ outputs of JK flip-flop circuit 63 are fed back to the J and K inputs, respectively, of flip-flop circuit 61. The double frequency signal $S_L$ is applied in parallel to the toggle inputs of all of flip-flop circuits 61 to 63. As is well known in the art, upon the occurrence of a negative going trailing edge of a signal at the toggle input of a JK flip-flop circuit, the JK flip-flop circuit assumes the set condition if a "1" exists only at its J input, a reset condition if a "1" exists only at its K input and is not affect if "0" exists at both its J and K inputs.

The gated trigger pulse $S_{MG}$ is fed to the flip-flop circuits 61 to 63 to preset them to a value which will begin the scanning of the color phosphor stripes with the correct color signal. Thus, the flip-flop circuit 61 is set by the gated trigger pulse $S_{MG}$ and the flip-flop circuits 62 and 63 are reset by the pulse $S_{MG}$ as indicated on FIGS. 10K, 10M and 10O. The Q-outputs $F_R$, $F_G$ and $F_B$ from flip-flop circuits 61, 62 and 63, respectively, which are used to gate the three colors, that is, red, green and blue respectively, are preset to $F_R=1$ and $F_G=F_B=0$. The frequency divider 60 is preset at the end of the run-in area to first gate the red color until the first red color phosphor stripe R is scanned.

After the scanning beam scans the first red color phosphor stripe in image area 6, the counting pulse $S_L$ at the toggle inputs T of the JK flip-flop circuits find the J input of flip-flop circuit 62 and the K input of flip-flop circuits 61 and 63 enabled. Consequently, at the negative going edge of the signal $S_L$ following the presetting operation, flip-flop circuit 61 is reset and flip-flop circuit 62 is set. No change takes place in flip-flop circuit 63 since both its inputs were "0" at the occurrence of the signal $S_L$. Thus, the Q-output $F_R$ of flip-flop circuit 61 becomes "0", the Q-output $F_G$ of flip-flop circuit 62 becomes "1" and the Q-output $F_B$ of flip-flop circuit 63 remains "0". At the next negative-going edge of signal $S_L$, the Q-output $F_G$ becomes "0" and the Q-output $F_B$ becomes "1". To complete the sequence, at the next negative going edge of signal $S_L$, the Q-outputs of the flip-flop circuits 61 to 63 return to their preset conditions. Thereafter, the above sequence is repeated across the image area 6.

Accordingly, the Q-inputs, $F_R$, $F_G$ and $F_B$ of the JK flip-flop circuits 61 to 63 becomes sequentially "1" at the proper times while the electron beam 14 scans the red, green and blue color phosphor stripes R, G and B of the image area 6.

Referring again to FIG. 8, the Q-output pulse signals $F_R$, $F_G$ and $F_B$ from the frequency divider 60 are shown to be applied to the second inputs of AND gates 71, 72 and 73, respectively. Flip-flop circuits 22 and 55 are reset by the trailing edge pulse $S_M$ from monostable multivibrator 52 and the reset output $\bar{F}_1$ (FIG. 10R) becomes "1" for enabling one input of each of AND gates 71 to 73. The gating pulses $F_R$, $F_G$ and $F_B$ are thus passed through the AND gates 71 to 73 as color gate signals $G_R$, $G_G$ and $G_B$ (FIGS. 10P, 10Q, and 10R) while the electron beam 14 scans the image area 6. Color gate signals $G_R$, $G_G$ and $G_B$ sequentially enable gate circuits 34, 35 and 36, respectively when the respective color gate signals are "1". Thus, red, green and blue primary color signals $E_R$, $E_G$ and $E_B$ are sequentially passed through the gate circuits 34 to 36 and fed through amplifier 33 to the first grid 18 of the color cathode ray tube 4 in step with the electron beam crossing corresponding color stripes.

AND gate 53 is inhibited by the "0" on the set output $F_2$ of flip-flop circuit and prevents the generation of further gated trigger pulses $S_{MG}$ until the next scan begins.

It will be appreciated that, during each scan across image area 6, the electron beam 14 is density-modulated by the red primary color signal $E_R$ when the beam 14 scans a red phosphor stripe R, by the green primary color signal $E_G$ when the beam 14 scans a green phosphor stripe G, and by the blue primary color signal $E_B$ when the beam 14 scans a blue phosphor stripe B to achieve color synchronization.

Figure 7A:
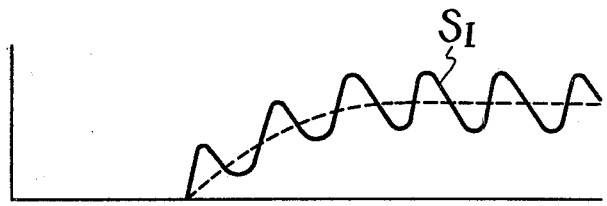
FIGS. 7A to 7C are waveform diagrams to which reference will be made in explaining the operation of the embodiments of the invention shown in FIGS. 5 and 6.

A possible problem which may arise with the embodiment shown in FIG. 5 is that noise pulses occurring while the beam scans the index stripes 11 in the run-in area 9 may be erroneously counted and can interfere with generating the counting signal $S_L$ with proper phase. This results in faulty color synchronization in the viewing area 6. This problem also arises at least partially due to the shape of the index signal $S_I$ shown in FIG. 7A.

The DC level of the output of the photodetector 17 is approximately zero before the first index stripe in the run-in area is crossed or energized. This is shown by the zero signal level in the left portion of FIG. 7A. After the first index stripe is crossed resulting in the first positive alternation, the DC level of the index signal $S_I$ does not return to zero but instead remains above zero due to the residual phosphorescence of the first index stripe after the scanning electron beam has moved past it. After the second alternation of the index signal $S_I$ its DC level is slightly higher than after the first alternation due to the phosphorescent contribution of both the first and second index stripes. This elevation of the DC level continues until a stable condition is attained at which the phosphorescence added by scanning each additional index stripe is balanced by the phosphorescent decay of all the index stripes previously scanned. Such a stable DC level is attained in FIG. 7A after the fourth alternation in the index signal $S_I$. The result of this start-up elevation of the DC level is similar to a sinusoid, shown in solid line, superimposed on a low-frequency signal, shown in dashed line. The low-frequency component may be detected as a phase error in the phase locked loop which can prevent accurate color synchronization. In addition, at zero or very low DC levels, the index signal may contain sufficient noise to permit false noise triggering.

One solution to this problem is shown in FIG. 6 in which a broad phosphor stripe 13 covers the extreme marginal region of the run-in area. The broad phosphor stripe 13 elevates the DC level to the desired average level and provides a relatively strong constant signal in that location to avoid triggering by noise. Closer in, index stripes 11 are provided having the usual width and pitch. In order that the average signal detected from the broad phosphor stripe 13 be approximately equal to the average level closer to the image area 6, the excited brightness of the broad phosphor stripe 13 is decreased to make its average level approximately equal to the average level due to the index.

Figure 7B:
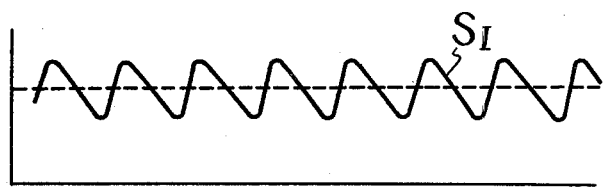
Figure 7C:
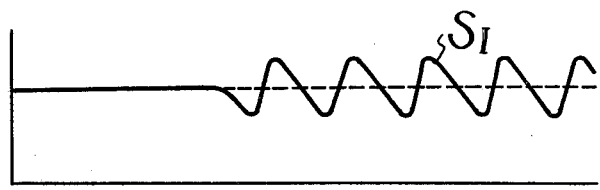

FIG. 7B shows the index signal $S_I$ which results from the scanning by an electron beam over the index stripes of the beam indexed cathode ray tube shown in FIG. 11. Although not shown in FIG. 11, a plurality of index phosphor stripes 11 which precede the position of the first one shown may be provided to elevate the DC level to its stable condition shown in FIG. 7B. Any errors which may arise due to noise or the low frequency superimposed signal during the initial part of a scan are eliminated by using the gap in the index signal $S_I$ due to the omitted index stripe in the location 12 to reset the frequency divider 60 just before the beam enters the image area 6.

It should be clear to one skilled in the art that a similar result can be achieved within the scope of the present invention by adding an extra index phosphor stripe 11 (not shown) rather than omitting one in order to have the counter 51 properly reset in preparation for counting the required number of index pulses $S_P$.

It should also be clear to one skilled in the art that index phosphor stripes which emit light when scanned by an electron beam could be replaced by other types of index stripes without departing from the scope of the invention. For example, index stripes which change their conductivity, capacitance or other detectable electrical characteristic upon being scanned by an electron beam could be substituted for the index phosphor stripes in the illustrative embodiment used in the foregoing to aid in explaining the invention.

Having described specific illustrative embodiments of the invention with reference to the accompanying drawings, it is to be understood that the invention is not limited to those precise embodiments, and that various changes and modifications may be effected therein by one skilled in the art without departing from the spirit or scope of the invention as defined in the appended claims.

What is claimed is:

1. A cathode ray tube system comprising a cathode ray tube having means for forming an electron beam, means to vary the intensity of said electron beam, and a screen, said screen having an image area and a run-in area contiguous with an edge of said image area, said image area having a repetitive pattern of a plurality of groups of color phosphor elements arranged side-by-side with each element of each group producing light of a different color when excited, a first set of index stripes spaced apart in said image area in the direction in which said phosphor stripes are arranged side-by-side, a second set of index stripes in said run-in area, said first and second sets of index stripes having a pitch which is related to the pitch of said groups of color phosphor elements, means for applying to said intensity varying means a signal having variations indicative of desired variations of the response of said color phosphor elements, means for generating an index signal in response to the scanning by said electron beam of said second set of index stripes, at least one cycle of said index signal having a longer period than others thereof, means responsive to the longer period of said at least one cycle to synchronize the time-phase position of said means for varying the intensity of the beam at the beginning of the scanning of said image area of the screen by said beam.

2. A cathode ray tube system according to claim 1, wherein said color phosphor elements are in the form of parallel stripes.

3. A cathode ray tube system according to claim 2, wherein said first and second sets of index stripes have a pitch of $(3n\pm1)/3$ times the pitch of said groups of color phosphor stripes where n is an integer including zero.

4. A cathode ray tube system according to claim 2, wherein said at least one cycle occurs at the boundary between said run-in area and said image area.

5. A cathode ray tube system according to claim 2, wherein said second set of index stripes begins where scanning of said electron beam begins.

6. A beam index cathode ray tube comprising: an envelope including a screen, means for scanning an electron beam across said screen, an image area on said screen having repetitive sets of parallel color phosphor stripes disposed thereon and having a first pitch, a run-in area contiguous with an edge of said image area, a first set of index stripes on said image area parallel to said color phosphor stripes, said first set of index stripes having a second pitch different from said first pitch, a second set of index stripes on said run-in area and having said second pitch, means responsive to scanning by said electron beam of said first and second sets of index stripes for generating an index signal and the index stripe in said second set nearest the boundary between said image area and said run-in area being omitted.

7. A beam-index cathode ray tube according to claim 6, further comprising at least one wide index stripe in said run-in area disposed a plurality of second pitches from said image area, said wide index stripe being at least as wide as said second pitch.

8. A beam-index cathode ray tube according to claim 7, wherein the instantaneous index signal resulting from excitation of said at least one wide index stripe by said electron beam is lower than the instantaneous index signal resulting from excitation of an individual one of said second set of index stripes.

9. A beam-index cathode ray tube according to claim 8, wherein the instantaneous index signal that results from excitation of said wide index stripe is equal to the instantaneous index signal that results from excitation of one index stripe of said second set times the width of one index stripe of said second set divided by said second pitch.

10. A control circuit for a beam index cathode ray tube of the type providing an index signal indicative of the position of a scanning beam which scans a run-in area and an image area, comprising: means for generating a counting signal having a frequency related to the frequency of said index signal, trigger signal generating means enabled by a synchronizing signal for generating a trigger signal in response to a characteristic of said index signal, frequency divider means operative in response to said counting signal to generate a sequential plurality of color control signals for sequentially controlling the application of color signals to said cathode ray tube, said trigger signal being effective to preset said frequency divider means to a predetermined condition at the boundary between said run-in area and said image area whereby synchronization of said plurality of color control signals is achieved, and means for blocking trigger signals generated in response to index signals resulting from the scanning of said image area by said electron beam.

11. A control circuit according to claim 10, wherein said means for blocking includes a gate controlling the transmission of said trigger signal, enabling means responsive to said synchronizing signal for enabling said gate, and means responsive to the generation of a first trigger signal to inhibit said gate whereby subsequent trigger signals are blocked.

12. A control circuit according to claim 10, wherein said means for generating a counting signal includes a phase locked loop fed with said index signal.

13. A control circuit according to claim 12, wherein the frequency of said counting signal is an integral multiple of the frequency of said index signal, and wherein said integral multiple is not divisible by three.

14. A control circuit according to claim 10, wherein said characteristic of the index signal is the last cycle of said index signal in said run-in area at the border of said image area having a different spacing than a standard spacing between the remaining cycles of said index signal.

15. A control circuit according to claim 14, wherein said different spacing is greater than said standard spacing.

16. A control circuit according to claim 10, wherein said characteristic is a gap in said index signal occurring just before said electron beam scans past the border between said run-in area and said image area.

17. A control circuit according to claim 10, wherein said frequency divider means is a three stage ring counter.

18. A beam index television system comprising: a beam index cathode ray tube having a screen, an image area on said screen having repetitive triads of parallel color phosphor stripes, said triads having a first pitch, a run-in area contiguous with an edge of said image area, a set of index stripes on said run-in area and said image area, said set of index stripes having a second pitch not integrally related to said first pitch, a plurality of said set of index stripes being on said run-in area, means for generating and scanning an electron beam across said screen, means for generating an index signal in response to said electron beam crossing said index stripes, means for generating a counting signal responsive to said index signal, trigger signal generating means enabled by a television synchronizing signal for generating a trigger signal in response to a characteristic of said index signal, frequency divider means operative in response to said counting signal to generate a plurality of color control signals for sequentially controlling the application of color signals to said cathode ray tube, and said trigger signal being effective to preset said frequency divider means to a predetermined condition just before said electron beam scans past the border between said run-in area, and said image area and means for blocking trigger signals generated in response to index signals from said electron beam scanning said image area whereby synchronization between said plurality of color control signals and scanning of said color phosphor stripes is achieved and maintained in said image area.

19. A beam index television system according to claim 18, further comprising at least one wide index stripe in said run-in area disposed at least a plurality of index stripes from said image area and having a width at least as wide as said second pitch.

20. A beam index television system according to claim 18, further comprising at least the index stripe in said run-in area nearest the boundary between said run-in area and said viewing area being omitted whereby a gap in the index signal occurs.

21. A beam index television system according to claim 20, further comprising resettable means responsive to said gap for generating said trigger signal.

* * * * *